United States Patent [19]

Van Avermaete

[11] Patent Number: 4,998,511

[45] Date of Patent: Mar. 12, 1991

[54] COMPRESSION IGNITION ENGINE WITH VARIABLE SWEPT VOLUME

[76] Inventor: Gilbert L. Ch. H. L. Van Avermaete, Um Bourbierg 2, L-3335 Hellange, Luxembourg

[21] Appl. No.: 368,317

[22] PCT Filed: Oct. 12, 1988

[86] PCT No.: PCT/LU88/00001

§ 371 Date: Jun. 14, 1989

§ 102(e) Date: Jun. 14, 1989

[87] PCT Pub. No.: WO89/03476

PCT Pub. Date: Apr. 20, 1989

[30] Foreign Application Priority Data

Oct. 16, 1987 [LU] Luxembourg ............................ 87021

[51] Int. Cl.⁵ .............................................. F02B 75/04
[52] U.S. Cl. ................... 123/48 B; 123/52 A
[58] Field of Search ............. 123/52 A, 51 A, 51 AA, 123/51 B, 70 R, 57 R, 48 R, 48 B, 58 R

[56] References Cited

U.S. PATENT DOCUMENTS

| | | | |
|---|---|---|---|
| 3,537,437 | 11/1970 | Paul et al. ......................... | 123/52 A |
| 3,570,459 | 3/1971 | Combs .................................. | 123/52 A |
| 3,623,463 | 11/1971 | Vries ................................... | 123/70 R |
| 3,675,630 | 7/1972 | Stratton ............................... | 123/70 R |
| 3,880,126 | 4/1975 | Thurston et al. ................... | 123/70 R |
| 3,934,562 | 1/1976 | Isaka .................................... | 123/73 R |
| 3,961,607 | 6/1976 | Brems .................................. | 123/78 R |
| 4,157,080 | 6/1979 | Hill ...................................... | 123/53 B |
| 4,170,970 | 10/1979 | McCandless ........................ | 123/53 BA |
| 4,470,379 | 9/1984 | Miyakoshi et al. ................. | 123/52 A |
| 4,516,541 | 5/1985 | Yungclas .............................. | 123/70 R |
| 4,625,684 | 12/1986 | Van Avermaete .................. | 123/48 A |

FOREIGN PATENT DOCUMENTS

| | | | |
|---|---|---|---|
| 389196 | 1/1924 | Fed. Rep. of Germany . | |
| 0149435 | 9/1983 | Japan .................................. | 123/52 A |
| 0200021 | 11/1984 | Japan .................................. | 123/52 A |

Primary Examiner—David A. Okonsky
Attorney, Agent, or Firm—Martin A. Farber

[57] ABSTRACT

The engine is characterized by an axial group of two cylinders (2, 7) communicating by means of a channel (22) situated in the cylinder head (20). Both cylinders (2, 7) joined side to side allow for a centralization of both crankshafts (4, 13) in the cylinder case (5). Each cylinder comprises a corresponding piston (1, 6) displaceable in the first cylinder (2) intended for the intake, compression, expansion and exhaust phases, said first piston (1) depending, via a piston rod (3), from the first crankshaft (4) situated in the cylinder case (5). The second piston (6) displaceable within the second cylinder (7) delimiting the combustion prechamber (8) wherein are housed a heating plug and a fuel injector, said second piston (6) depending, via a piston rod (12), from the second crankshaft (13) also located in cylinder case (5). The first crankshaft (4) is connected by means of a transmission to the second crankshaft (13) via the coupler (not shown), the latter varying the timing between the two above-mentioned crankshafts as a funtion of the over-boost pressure. The gas pedal (not shown) acts via known means on the amount of fuel to be injected into the combustion prechamber (8).

4 Claims, 5 Drawing Sheets

COMPRESSION IGNITION ENGINE WITH VARIABLE SWEPT VOLUME

The present invention concerns a variable volumetric ratio, self-ignition internal combustion engine such as is described in the Luxemburg patent No. 86 506 for a controlled ignition, mixed combustion cycle engine, which comprises an axial grouping of three cylinders disposed in a triangle thus permitting a parallel centralisation of the two crankshafts in the cylinder block.

The surpose of the present invention concerns the means of building a self-ignition internal combustion engine capable of operating at low compression rates and high supercharge rates. These means permit the introduction into the cylinder of a greater quantity of air allowing the combustion of a higher weight of fuel without increase in maximum pressure; it derives from these means an increase in the average pressure without having to increase the maximum pressure. Means for starting and operating the engine without the addition of a supercharge are also provided.

To achieve this and according to the invention, it appeared advantageous to build an engine comprising the grouping together of two axially arranged cylinders side by side, to allow a centralisation of two crankshafts in the cylinder block. Each cylinder has its corresponding piston, the first piston moving in the first cylinder and ensuring the inlet, compression, expansion and exhaust cycles, this first piston, via a connecting rod, depending on the first crankshaft located in the cylinder block, the second piston moving in the second cylinder delimiting the pre-combustion chamber in which are located a heater plug and a fuel injection nozzle, this second piston, via a connecting rod, depending on the second crankshaft also located in the cylinder block. By means of a transmission arrangement the first crankshaft is connected to the second crankshaft via the coupler located either inside or outside the cylinder block. The accelerator control acts in a known way on the quantity of fuel to be injected into the pre-combustion chamber.

The invention is applicable to both two and four-stroke engines.

As an example, we have represented a preferred version of the invention, related in particular to a two-stroke engine. In any event, it will be readily understood by means of the description which follows as well as by means of the attached drawings where:

Figure 1:
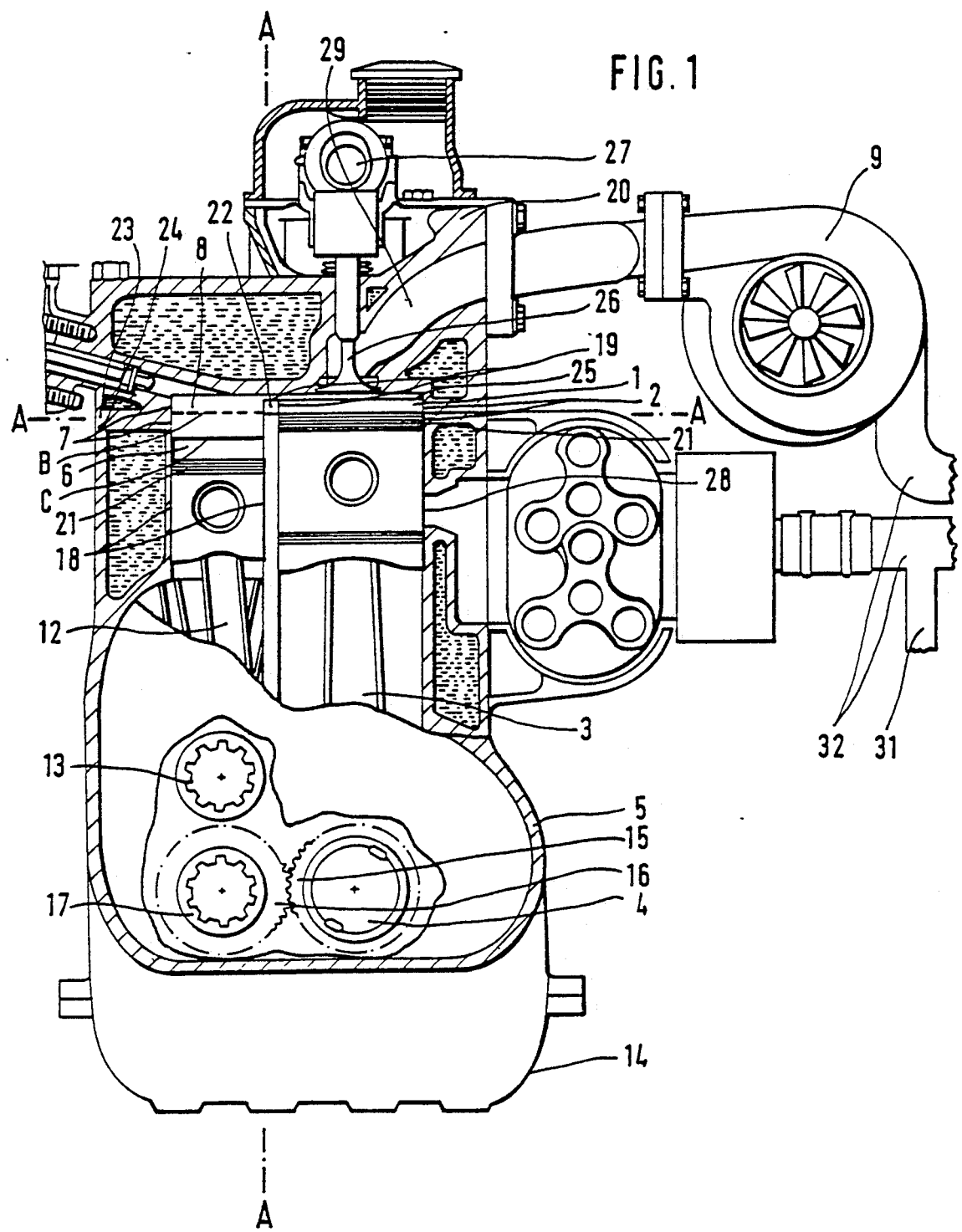
FIG. 1 is a partial view of the cross-sections across the two parallels A—A of the transversal part of a two-stroke engine showing in the foreground gearing ensuring via the coupler the transmission between the two crankshafts.
Figure 2:
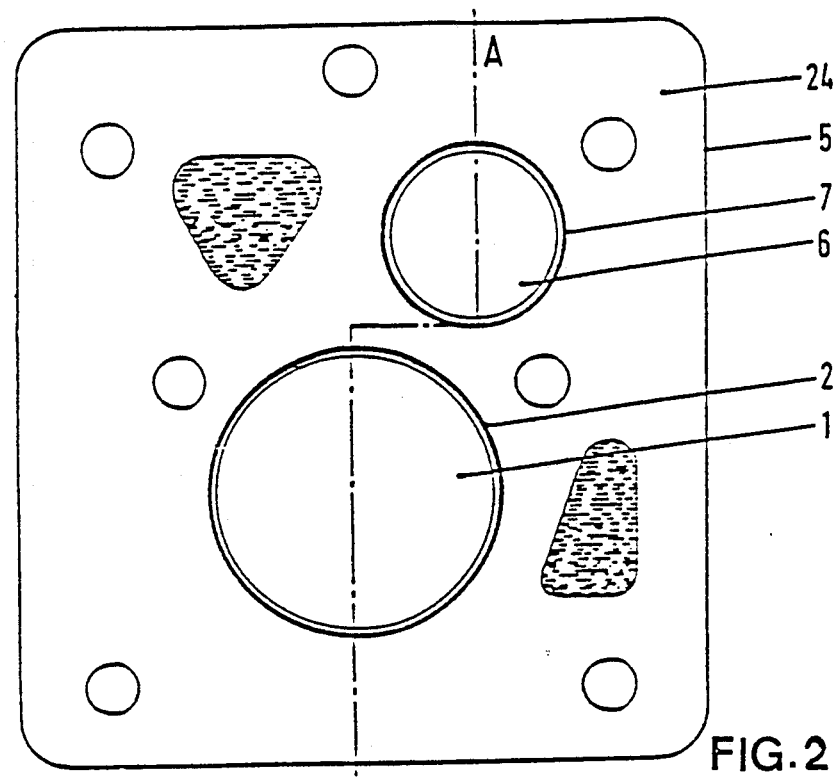
FIG. 2 is a plan view of the cylinder block gasket face connecting to the cylinder head through parallel plane cross-sections A—A.

In accordance with the invention, the drawings illustrate an engine uniting in a parallel arrangement, side by side, the first and second cylinders (2) and (7) in a manner such that the latter are aligned obliquely on the plane of the cylinder head gasket face (23,24) in relation to the lines of shafting of the two crankshafts (4) and (13). The advantage of this arrangement is that it allows for the wedging in of the rotational planes of the two pins in a manner such that the rotational plane of the first crankshaft (4) wedges in beside the rotational plane of the second crankshaft's pin (13). The bottom orifices of the two cylinders (2), (7) intended for the movement of their pistons respectively (1) and (6), are located in the cylinder block (5) opposite the two crankshafts (4) and (13) respectively and the engine oil crankcase (14).

This wedging in arrangement offers the advantage of reducing the centreline distance between the axes of the two crankshafts (4) and (13) as well as that of the two cylinders (2) and (7), thus resulting in a reduction of the bulk of the cylinder block (5).

According to the form of engine construction, where the coupler is located axially outside the cylinder block (5) (see FIG. 1), this form comprises means ensuring that the transmission between the two crankshafts (4) and (13) is made by a pair of gearwheels (15) and (16) forming part of the cylinder block (5); the first gear (15), lined up on the output shaft of the first crankshaft (4) drives the second gear (16).

When the coupler is mounted on the cylinder block (5), the input drive shaft of the coupler case input gear is locked with shaft (17) of the second gear (16), whilst the output drive shaft of the coupler case locks with the output shaft of the second crankshaft (13) such that the two crankshafts (4) and (13) form one kinematic chain at the same rotational speed where the coupler and coupler means are also situated in order to allow variations of the angular difference between the two crankshafts (4) and (13).

It is obvious that this form of construction is represented solely as an example and is not limiting.

According to another form of construction of the invention, the four-stroke engine can also be provided with a kinematic chain where crankshaft (13) revolves at half the speed of crankshaft (4).

Figure 5:
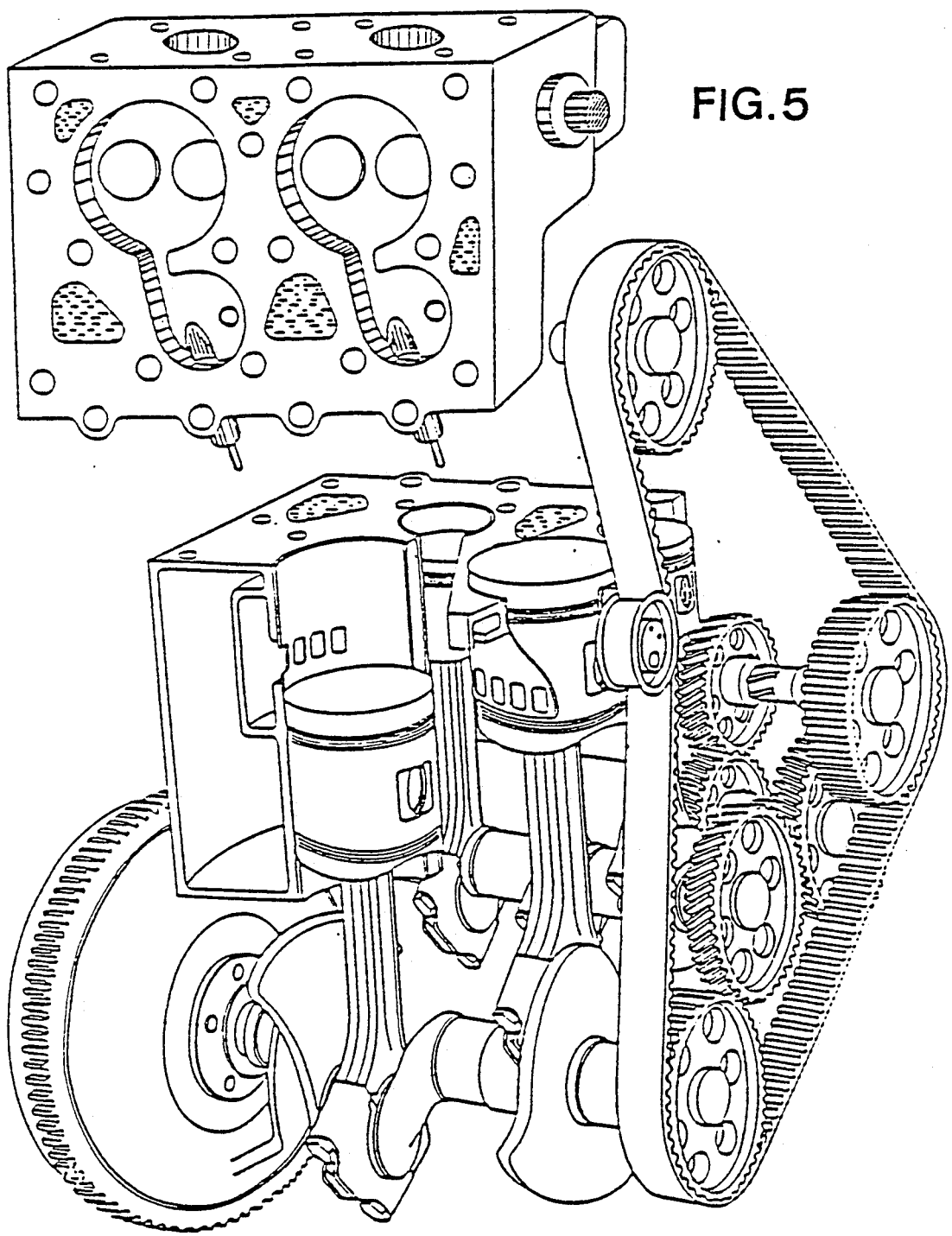
Figure 6:
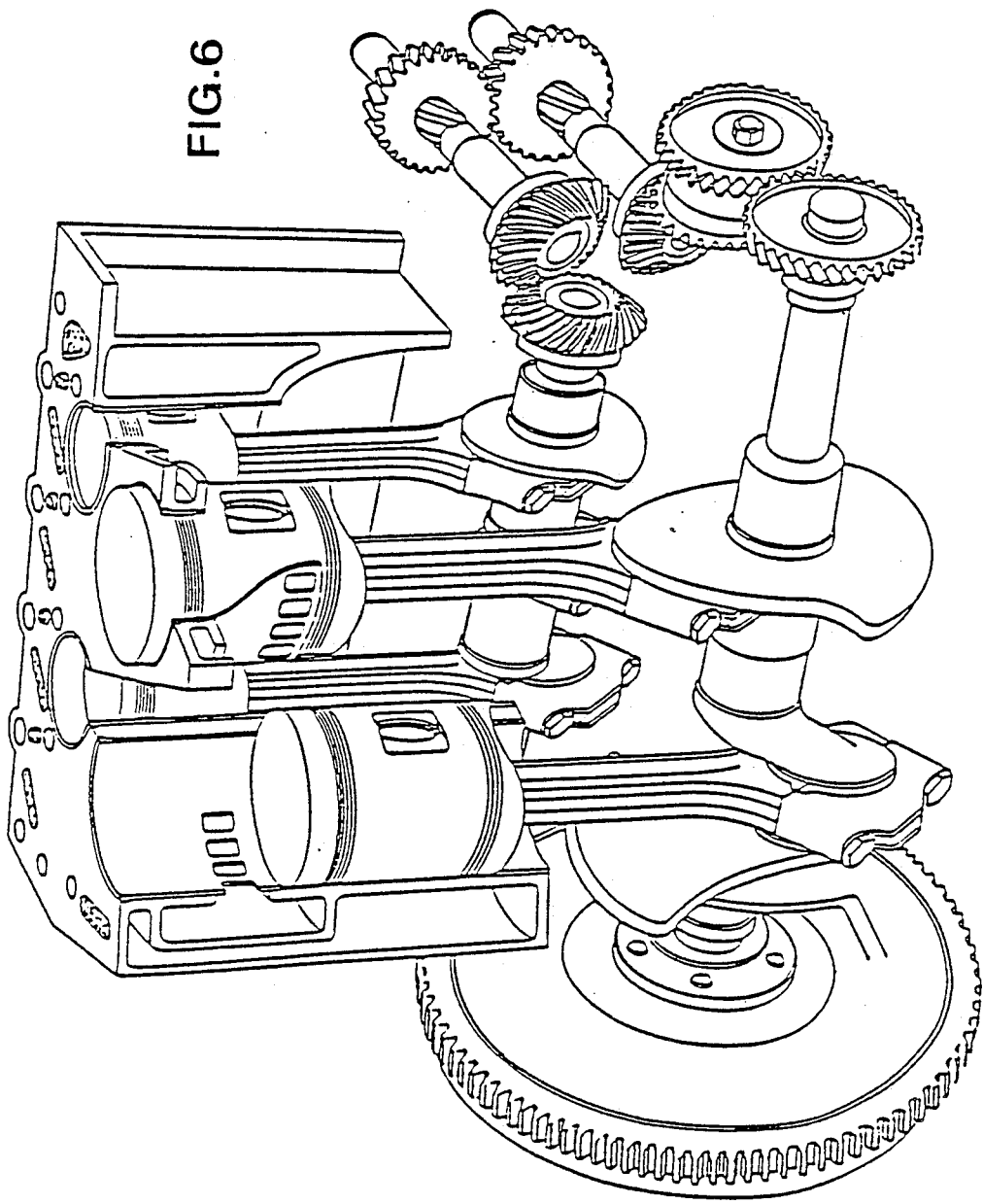

Other forms of construction of the invention can also be provided, namely when the coupler is arranged axially or radially inside the cylinder block (5) or radially outside the cylinder block (5) (FIGS. 5 and 6).

Figure 4:
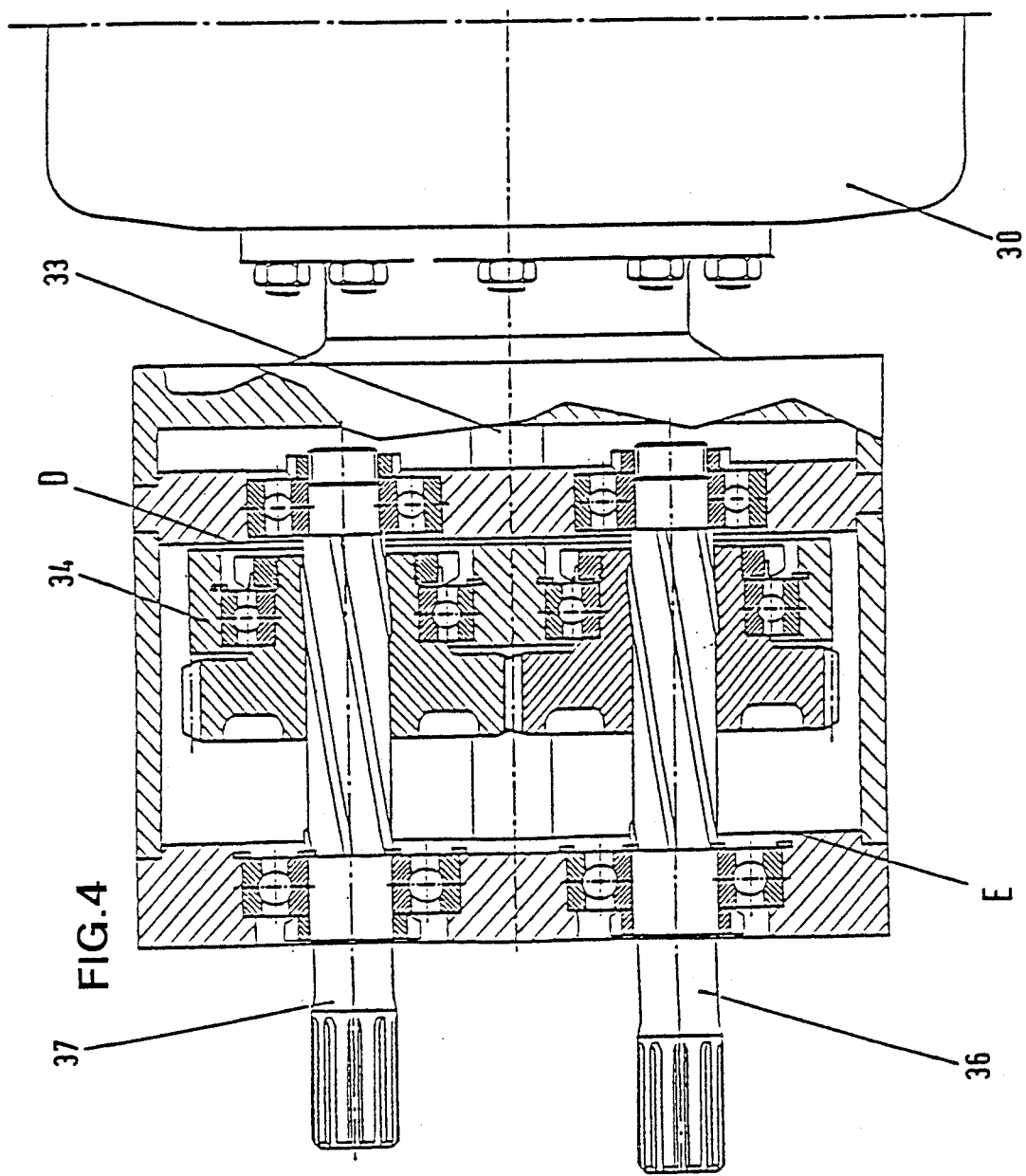
FIGS. 4–6 are further views of the engine.

During the branching between the two coupler transmission shafts and the two crankshafts (4) and (13), via the intermediate shaft (17), locking is ensured in a manner such that carrier (34) of the coupler occupies the first stop limit of the axial movement of carriage (34) (in position D, FIG. 4). The coupler input shaft (36), longer than the output shaft (37) is branched on the shaft of the second gearwheel (16) with piston (1) of the first cylinder (2) located at top dead centre, at the end of the compression phase. The coupler output shaft (37) is branched on the shaft of the second crankshaft (13) when piston (6) of second cylinder (7) is at top dead centre or after top dead centre.

Positioning of the coupler carriage (34) at the first stop limit of the axial movement of the carriage (34) ensures an angular dephasing of the two crankshafts (4), (13), in a manner such as to cyclicly synchronize the positionings of piston (6) (in position B, FIG. 1) of pre-combustion chamber (8), end of compression, with a greater volumetric ratio.

The positioning of coupler carriage (34) at the second stop limit of the other side of the axial movement of carriage (34) (in position E, FIG. 4) ensures another angular dephasing of the two crankshafts (4) and (13), so as to cyclicly synchronize positionings of piston (6) (in position C, FIG. 1) of the pre-combustion chamber (8), at end of compression, with a smaller volumetric ratio. This means that in every position of coupler carriage (34), between the first and second stop limits, there is a different volumetric ratio.

According to the invention, means are provided in order to synchronize and automatize the axial displacement of coupler carriage (34) depending on the supercharge pressure (FIG. 4).

Following one method of engine construction, according to the invention, a pneumatic ram (30) is connected by piping (31) to the supercharge line (32), between the engine and the turbocompressor (9). The pneumatic ram (30) (FIG. 4) is equipped with a piston governed by means of a calibrated spring, the said piston communicating at the outside of the ram (30) via a spindle (33) locked with coupler carriage (34) such that the supercharge pressure in ram (30) can act on the piston and coupler carriage (34) until contraction of the calibrated spring balances the supercharge pressure.

According to the invention, means are also provided to vary the stop of the injection pump determining the maximum fuel feed in relation to the volumetric rate of the engine. To achieve this, the above-mentioned stop is connected to the spindle of the pneumatic piston (33) locked with coupler carriage (34) by either mechanical, electric or other means, such that the displacements of the pneumatic piston engendered by the supercharge pressures cause a simultaneous variation of the volumetric ratio and of the said stop. The latter is regulated in order to allow an increase in the maximum fuel feed proportional to the reduction of the volumetric ratio. These means are intended, in the event of accidental failure of pneumatic ram (30) to lock the above-mentioned stop with the coupler carriage (34) thus limiting the supercharge pressure and, all the more so, the maximum combustion pressure.

The invention also provides for means of assembling the two cylinders (2) and (7), each cylinder being made up of two elements (18) and (19). The first elements (18) of cylinders (2) and (7), open at both extremities, are either directly bored out of the cylinder block (5), or made in the form of liners fitting in to appropiate recesses of the cylinder block (5), pressure seals being provided by a ring at the top of the liners, seated in a recess provided in the cylinder block gasket face (24) of the cylinder block (5); the second elements (19) of cylinders (2) and (7), closed at the end opposite the joint of the two elements (18) and (19), are either directly bored out of the cylinder head (20) or made in the form of liners fitting into appropriate recesses in the said cylinder head (20), pressure seals being provided by a ring at the bottom of the liners, seated in a recess provided in the gasket face (23) of the cylinder head (20).

The liners of both the cylinder block (5) and of the cylinder head (20) can be made as single items.

When the gasket faces (23) and (24) of the cylinder head (20) and of the cylinder block (5) are brought together the first and second elements (18) and (19) come together axially to form the two cylinders (2) and (7).

When the engine runs, rotation of the first crankshaft (4) imparts a reciprocating motion to the first piston (1) moving in the first and second elements (18), (19) of the first cylinder (2). Rotation of the second crankshaft (13) imparts a reciprocating movement of piston (6) in the first and second elements (18 and 19) of the second cylinder (7).

So far as the distribution is concerned, the bottom of the second element (19) of the first cylinder (2) comprises an exhaust duct (29) cut in the cylinder head (20) that communicates with the cylinder (2) via two valves (26) and (26'). The valves are actuated by a camshaft (27) driven at the same speed of rotation by one of the two crankshafts (4) or (13). Inlet ports (28) are arranged on the periphery of the first cylinder (2) so that they either opened or closed by the first piston (1) of the first cylinder (2).

Figure 3:
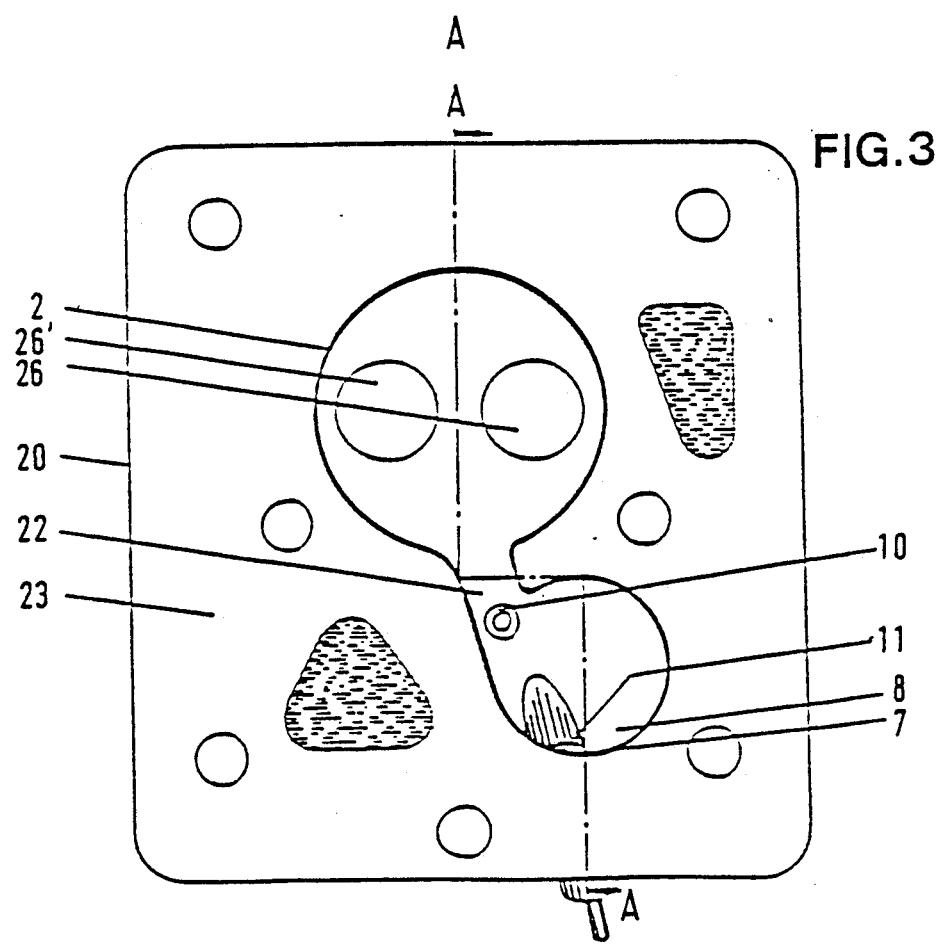
FIG. 3 is a plan view of the cylinder head gasket face connecting to the cylinder block through parallel plane cross-sections A—A.

In an engine construction mode according to the invention, the space rendered free in the cylinder head (20) allows for arrangement of one orifice for the heating plug (10) and a second orifice for the fuel injector (11) (FIG. 3).

According to the invention, means are provided regarding the positioning of the two crankshafts (4), (13) located in the cylinder block (5), so as to cause the crowns of the two pistons (1) and (6), above their rings (21), to protrude beyond the first elements (18) of the two cylinders (2) and (7) in cylinder head (20).

In compliance with the invention, means are also provided by a recess (22) in the gasket face (23) of cylinder head (20); this recess is located between the two cylinders (2) and (7) and extends through and down to the depth of the walls of the second elements (19) of the two cylinders (2) and (7) thus forming a distribution chamber (22) between the pre-combustion chamber (8) of the second cylinder (7) and the free space of the first cylinder (2) when the gasket faces (23 and 24) of the cylinder head (20) and of the cylinder block (5) are fitted together.

The distribution chamber (22) is provided with a large section branch in order to facilitate the massive transfer of combustion fluid at high frequency between the two cylinders (2) and (7) during the compression, combustion and expansion phases.

I claim:

1. In a variable volumetric ratio, self ignition internal combustion engine, which comprises an axial grouping of two cylinders arranged in a parallel direction, side by side, with a centralization of two crankshafts in a cylinder block, the improvement wherein each cylinder comprises a corresponding piston, a first of said pistons moving in a first of said cylinders, which serves for inlet, compression, expansion and exhaust phases, and via a connecting rod depends on a first of said crankshafts located in the cylinder block, a second of said pistons moving in a second of said cylinders, which delimits a pre-combustion chamber where a heating plug and a fuel injector are located, and depending via a connecting rod on a second of said crankshafts also located in the cylinder block, and the first crankshaft is operatively connected by a transmission to the second crankshaft.

2. In a variable volumetric ratio, self ignition internal combustion engine, which comprises an axial grouping of two cylinders arranged in a parallel direction, side by side, with a centralization of two crankshafts in a cylinder block, the improvement comprising means connecting a pin of a pneumatically controlled piston to a stop of an injection pump determining maximum fuel feed, such that displacements of the pneumatically controlled piston engendered by supercharge pressures cause a simultaneous variation of the volumetric ratio and of said stop, thereby permitting an increase in the maximum fuel feed proportional to reduction of the volumetric ratio.

3. In a variable volumetric ratio, self ignition internal combustion engine, which comprises an axial grouping of two cylinders arranged in a parallel direction, side by side, with a centralization of two crankshafts in a cylinder block, the improvement comprising
- means for positioning of the two crankshafts so as to cause a crown of each piston to protrude, at an appropriate cycle, beyond first elements of the two cylinders of the block, the protrusion of the crowns of the pistons corresponding with space reserved for second elements of said two cylinders of a cylinder head.

4. The engine according to claim 1, further comprising
- means for forming a communication duct between the pre-combustion chamber of the second cylinder and the first cylinder, when gasket faces of a cylinder head and the cylinder block are fitted together.

* * * * *